United States Patent
Hoenninger et al.

(10) Patent No.: US 7,319,923 B2
(45) Date of Patent: Jan. 15, 2008

(54) METHOD AND DEVICE FOR CONTROLLING OPERATIONAL SEQUENCES IN A VEHICLE

(75) Inventors: Harald Hoenninger, Freiburg (DE); Christian Tischer, Hemmingen (DE)

(73) Assignee: Robert Bosch GmbH, Stuttgart (DE)

( * ) Notice: Subject to any disclaimer, the term of this patent is extended or adjusted under 35 U.S.C. 154(b) by 258 days.

(21) Appl. No.: 10/949,843

(22) Filed: Sep. 23, 2004

(65) Prior Publication Data

US 2005/0085953 A1 Apr. 21, 2005

(30) Foreign Application Priority Data

Sep. 23, 2003 (DE) .................. 103 44 008

(51) Int. Cl.
*G06F 7/00* (2006.01)
(52) U.S. Cl. ........................................ 701/1
(58) Field of Classification Search .............. 701/1, 701/29, 36; 340/425.5; 702/183, 188; 714/25, 714/46
See application file for complete search history.

(56) References Cited

U.S. PATENT DOCUMENTS 6,577,934 B2 * 6/2003 Matsunaga et al. ........... 701/29
7,016,769 B2 * 3/2006 Hurich et al. .................. 701/1

FOREIGN PATENT DOCUMENTS

DE 198 38 333 3/2000

OTHER PUBLICATIONS

T. Bertram et al., "Cartronic- An Open Architecture for Networking the Contreol Systems of an Automobile", SAE Technical Paper Series 980200, Feb. 23-26, 1998.
T. Bertram et al., "Cartronic- Ein Ordnungskonzept für die Steuerungs- und Regelungssysteme in Kraftfahrzeugen", 1997 VDI Publication.

* cited by examiner

*Primary Examiner*—Yonel Beaulieu
(74) *Attorney, Agent, or Firm*—Kenyon & Kenyon LLP

(57) ABSTRACT

A method and a device for controlling operational sequences in a vehicle in which at least one first processor is provided in at least one control device, which is used for the control of functions of the operational sequences of the vehicle, and at least one second processor of a vehicle-external portable technical unit as coprocessor is able to be connected to the at least one control device, using connection means and is used in addition to the at least one first processor for the control of functions of the operational sequences.

21 Claims, 3 Drawing Sheets

METHOD AND DEVICE FOR CONTROLLING OPERATIONAL SEQUENCES IN A VEHICLE

FIELD OF THE INVENTION

The present invention relates to a method and a device for controlling operational sequences in a vehicle as well as on a control device and a technical unit.

BACKGROUND INFORMATION

Processor units for data-processing-based, electronic control systems in a motor vehicle are conventional. For instance, such a processor unit includes in its functional structure a processing unit, a vehicle interface unit and, for certain tasks, a coprocessor unit, namely a communication coprocessor, for example. In other words, the processor unit has a coprocessor, which carries out tasks that will then no longer need to be performed by the processing unit.

In addition, architectures for structuring and partitioning software are conventional, in particular in the case of single control devices or networked control devices, by which a defined division of functions with respect to the control of operational sequences in a vehicle is possible. An example of such an architecture is the Cartronic concept according to the 1997 VDI publication "Cartronic—A Structure Concept For The Control And Regulation Systems In Motor Vehicles"—or also a corresponding SAE paper dating from 1998, the SAE paper 980200 "Cartronic—An Open Architecture For Networking The Control Systems Of An Automobile." On this basis, the structuring of the control software and its functionality is performed according to a predefined, agreed-upon software structure including appropriate interfaces; individual functionalities are also described in German Patent Application No. DE 198 38 333 A1 by way of example.

However, the working capacity and the available resources with respect to the control devices and the processors included therein are generally very limited, in particular for reasons of cost. Especially internal coprocessors, which are not needed all the time, cause additional expense. On the other hand, however, the functional requirements with respect to the control of operational sequences in a vehicle continue to grow, especially as far as scope and quality are concerned.

It is an objective of the present invention to improve the described situation, thereby not only taking the rising functional demands into account, but also limit the cost.

SUMMARY

In accordance with the present invention, a method and a device are provided for controlling operational sequences in a vehicle in which at least one first processor is provided in at least one control device, which is used to control functions of the operational sequences of the vehicle. Furthermore, in an advantageous manner, at least one second processor of a vehicle-external, portable technical unit such as a mobile cellular phone, a PDA (personal digital assistant) or organizer or also a laptop etc., is used in addition, as coprocessor, and is able to be connected to the at least one control device via connection means, so that this second processor of the technical unit is used in addition to the at least one first processor for the control of functions of the operational sequences. The present invention also relates to this type of device and the corresponding method as well as to the vehicle-external portable technical unit and a corresponding control device.

The functions for controlling the operational sequences may usefully be divided into first and second functions, and the second processor, as coprocessor, may be used only for the second functions, so that the first functions are basically performed by a control device, in particular the so-called first processor. In this way, it is possible to take the fact into account that, for example, hardware-dependent functions with respect to the control device and/or the first processor, real-time-critical functions and safety-critical functions, in each case with respect to the control of the operational sequences, are included among the first functions and are thus generally processed in the control device by the first processor in order to prevent any risks. On the other hand, the second functions may then include running-time-intensive and/or computing-time intensive functions with respect to the control of the operational sequences, which are executed selectively or completely by the second processor of the portable technical unit, the second processor being used as coprocessor.

In a first example embodiment, the functions performed by the second processor as coprocessor are transmitted from the control device to the technical unit, so that they may be executed there. In a second example embodiment, the functions performed by the second processor are included as additional functions or as user-specific functions in a memory of the technical unit where they are executed by the second processor. According to the first and second example embodiments, a mixed variant is also possible, so that a portion of the functionality is transmitted from the control device to the technical unit and another portion is included in the technical unit. According to the present invention, the second functions may therefore include additional functions with respect to the control of the operational sequences of the vehicle, which, as described, are included only in the technical unit and which supplement functions provided in the control device. These may be user-specific functions, in particular, which are not to be stored in the control device, for example.

In an advantageous manner, the functions for controlling the operational sequences may be divided into different priority groups, so that the second processor as coprocessor may be used only for functions of at least one predefined priority group, which makes it possible, in particular, to take certain security stipulations into account. To achieve such a linking and nesting of different functions within the framework of controlling operational sequences in vehicles, it may be useful and advantageous if the functions are structured according to a predefined software structure concept including appropriate interfaces, in particular according to Cartronic, thereby simplifying the function transfer, execution and retransmission of certain values between the processors executing the functions.

In the process, the exchange or the communication between the first and second processor may be realized with the aid of connection means, for instance in a line-conducted or a wireless manner. In a first example embodiment, the connection is realized in such a way that it advantageously includes an interface unit, which is connected to a communication system of the vehicle, so that the technical unit and the control device are indirectly connected via this communication system of the vehicle to which the control device is connected as well. In another example embodiment, a second interface unit is provided, which is expediently included in the control device itself, so that a direct connection of the technical unit and the control device is able to be implemented via this second interface unit.

To allow such communication between technical unit and control device in general, the connection means also include adaptation means for data conversion or protocol realization so as to enable such a communication. The adaptation means may be included either in the technical unit or in the control device and also in both communication partners.

The present invention therefore increases not only the working capacity and the available resources while simultaneously controlling costs, but it also makes it possible for mass-produced processing units or processors or corresponding control devices which do not give consumers, groups or individuals the possibility of utilizing specific functions or also additional functions, to do just that, thereby creating a substantial market potential for new software products to be marketed to consumers. This allows the computing capacity of the vehicle processing unit, i.e., the at least one first processor, to be expanded by an individually programmable, flexible supplementary processor, so that a functionality or a supplementary functionality provided in the vehicle is executed in the portable processor connected to the control device or in the at least one second processor of the technical unit so as to achieve the aforementioned advantages.

BRIEF DESCRIPTION OF THE DRAWINGS

The present invention is explained in greater detail in the following with reference to the following figures.

DETAILED DESCRIPTION OF EXAMPLE EMBODIMENTS

Figure 1:
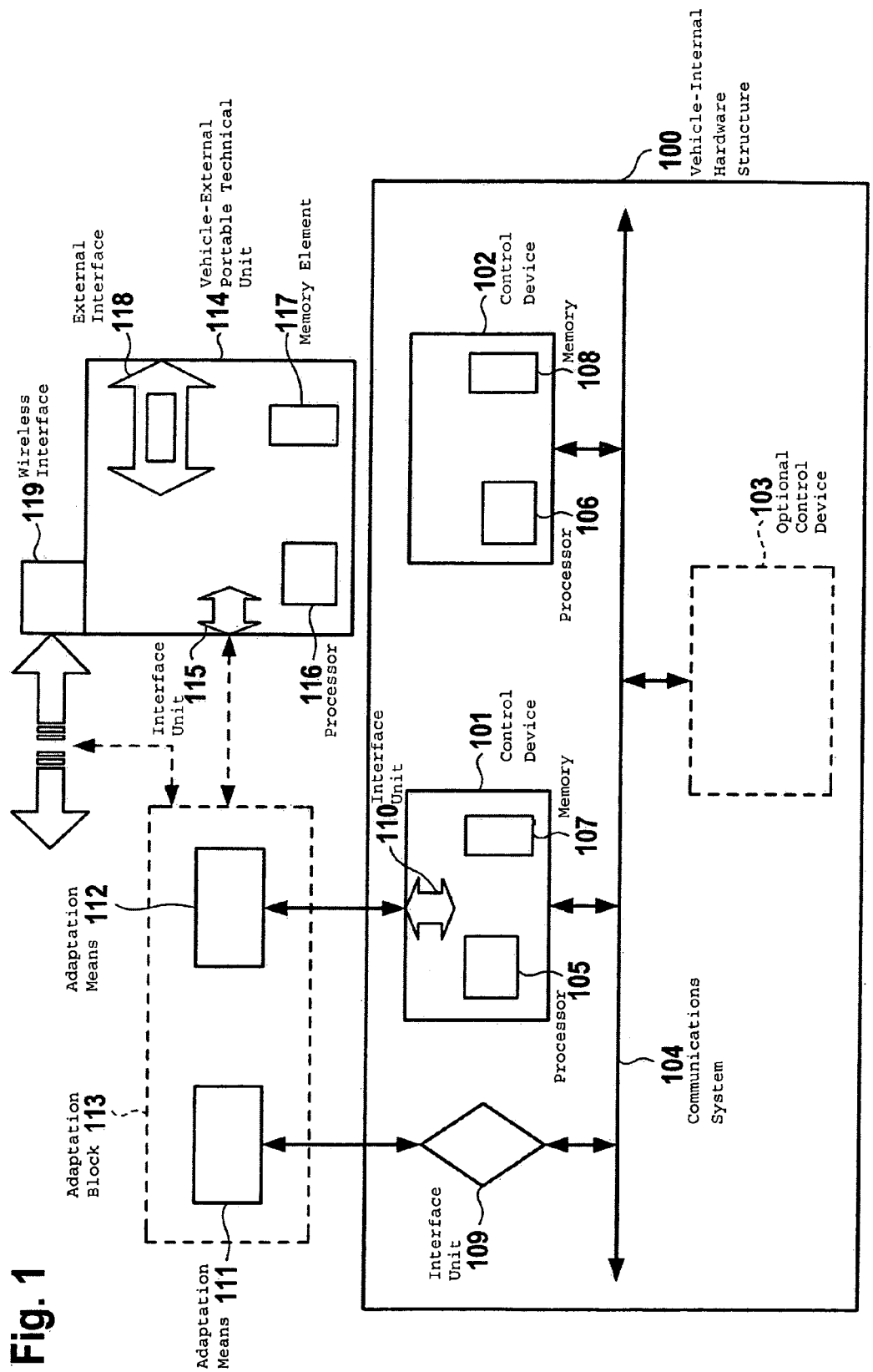
FIG. 1 shows a vehicle-internal networked hardware system having various control devices as well as corresponding interfaces with the portable technical unit according to the present invention.

FIG. 1 shows a vehicle-internal hardware structure 100 in which control devices 101 and 102 are interconnected via a communication system 104. Reference numeral 103 denotes at least one optional further control device, which is likewise coupled into this vehicle-internal control-device interconnection via communication connection 104. Reference numeral 114 denotes a vehicle-external portable technical unit, which in particular represents a mobile cellular phone, a PDA (personal digital assistant), an organizer or a portable small computer such as a laptop carried along. In this context, vehicle-external means that portable technical unit 114 is not part of vehicle-internal hardware system 100 initially, but at first is basically used inside and outside the vehicle in a general manner. To this end, portable technical unit 114 includes an execution or processing unit, i.e., a processor 116, and a memory element 117, which may also be located inside processor 116. In addition, the portable technical unit has a conventional external interface 118, which has various designs depending on the type and is shown only symbolically. Hiding behind this external interface 118 are display systems such as a monitor as well as input possibilities, for instance a keyboard, the writing pad of an organizer, a mouse or a touch pad having an appropriate functionality, a track ball etc. That is to say, this external interface 118 is generally used to input and output user data.

Each of the control devices of control-unit interconnection 100 inside the vehicle incorporates both a processing unit or execution unit, i.e., a processor 105 or 106, as well as a corresponding control-device-internal memory 107 or 108, respectively, which may likewise be accommodated inside the respective processor 105 or 106. According to the present invention, this portable vehicle-external technical unit 114 is then connected to vehicle-internal hardware interconnection 100. This application is carried out via connection means CM, which is made up of a plurality of components. Provided within hardware interconnection 100 in the vehicle is an interface unit which allows a coupling. This may be, for example, a first interface unit 109, which provides a connection to communication system 104. A second interface unit 110 is housed in control device 101, for example, in particular a serial interface so that a connection may be established here as well. In the same way, a third interface unit 115 is provided in external portable technical 114 in order to allow the connection. To the extent that it is included in external unit 114, it is optionally possible to provide a wireless interface 119 as fourth interface unit.

Shown as 111 and 112 are adaptation means, in particular interface converters or protocol converters, in order to make the exchange possible. Adaptation means 111 is assigned to first interface 109 with communication connection 104, and adaptation means 112 are assigned to control-device-internal interface 110, in particular a serial interface. The connection means according to the present invention are therefore made up, for one, of at least one vehicle-side interface unit, namely 109 and/or 110, and at least one interface unit 115 or 119 which is located on the side of the portable technical unit, as well as corresponding adaptation means 111 and 112 so as to allow an interface-protocol conversion between technical unit 114 and vehicle-hardware system 100. First interface unit 109 connects external unit 114 to, for instance, a CAN network, TT-CAN network, a Flex-Ray bus system or also other variants of communication systems such as a TTP/C, LIN bus or a MOST bus system, in particular. This makes it possible to support any functions for controlling the operational sequences via the control-device interconnection, i.e., hardware system 100 having communication connection 104, and thus to support any first processors, such as 105 or 106, via second processor 116. Hardware system 100 also includes sensors and actuators, which are either directly connected to the control device or else are also coupled to the control-device interconnection via the communication connection. These, too, are meant to be represented by optional additional component 103. Each interface unit 110 is located directly inside a control device—in this case—, thereby allowing portable technical unit 114 to be coupled directly to control device 101 and thus an additional utilization of the processor output of second processor 116 for certain functions. This interface unit 110 is assigned adaptation means 112, which, similar to adaptation means 111, allow a conversion of the interface or the corresponding protocol and in this way a connection to portable technical unit 114 via interface unit 115 or interface unit 119. Any combination of the individual components of the connection means is conceivable in this context, which is to be symbolically represented via adaptation block 113. For instance, it is possible to provide either only an interface connection via adaptation means 112, interface unit 110 and interface unit 115, and it is possible just as well to provide a connection via interface unit 109, adaptation means 111 and interface unit 115. These two variants for representing the connection means, i.e., 109, 111, 115 as well as 110, 112 and 115, may then be configured as line-conducting means; it is possible, in particular, that connection means 110, 112 and 115 are designed as serial interface, such as USB connection, RS232 interface or K-line, etc. Connection variants such as PCM-CIA, FireWire, Ethernet or other connections are equally possible. That is to say, in particular the use of generally utilized standard interfaces is advantageous, especially for reasons of cost.

In addition, the connection means, that is, any combination made up of elements 109, 110, 111, 112 and 115, 119, may also be designed to be wireless, i.e., operate via radio, ultrasound, infrared, etc. To this end, the radio interface, which is already included in some technical portable terminal devices, for instance as indicated in the case of a mobile telephone or technical device having GSM or GPS capabilities, may then be utilized by interface unit 119. In this case, it may be necessary to configure the corresponding interface units according to the wireless connection, in particular especially 109 and/or 110. Here, too, standard interfaces such as Bluetooth, wireless LAN etc. may be utilized.

Adaptation means 111 and 112 in adaptation block 113 are then configured in accordance with the selected connection and implement the adaptation or conversion of the particular interfaces or protocols. Depending on the selected connection means, both adaptation means may be present, i.e., according to adaptation means 113, or only one adaptation means in each case in accordance with the selected interfaces. The adaptation means may be housed either in hardware system 100 of the vehicle, in particular inside the control device itself, especially in the respective interface unit, i.e., that means also inside interface unit 109, or they may be part of portable technical unit 114, in particular also the corresponding interface units 115 and/or 119. A division of the adaptation means among hardware system 100 and technical device 114 is possible as well, so that—if the at least two adaptation means 111 and 112 are present—one is either assigned to hardware system 100 and one to technical device 114, or also one or at least both adaptation means are split up in each case, so that one part is located in the portable device and another part in the hardware system.

This produces in a connection of the at least one first processor, namely the processing unit inside the vehicle, via a conventional, in particular standardized contacting technology, or a contacting technology that is to be developed further, having a defined interface and a corresponding communication protocol with a portable processing unit, i.e., the at least one second processor of technical unit 114. This expands the processing capacity of the vehicle processing unit by an individually programmable, flexible additional processing unit.

Functions or also a supplementary functionality provided in the vehicle processor or vehicle control device may thus be executed in the portable technical unit connected to the control device, as is explained in greater detail below in connection with FIGS. 2 and 3.

The data exchange between the processors or computing devices may be carried out in real time or, if this is not required, in an asynchronous manner, for example using buffer-stored data packets as a function of the capacity utilization of the system, which may thereby be taken into account in an advantageous manner. Last but not least, this data exchange is related to the functions to be executed by coprocessor 116. In FIG. 2, a function architecture or software structure 200, which is structured according to the Cartronic concept, for instance, is provided in the vehicle for this purpose. Provided therein are, for example, functional blocks 201, 202 and 203, each of which includes individual functions 201a to 201d, 202a to 202d and 203a to 203d. The division and number of individual functions have been selected at random in this example and in particular depend on the selected overall structure 200, especially the provided Cartronic structuring. The functions may be divided into first and second functions, so that functions 203a, 202b, 203d, for instance, or also 202d are added to second functions, which generally are able to be executed by the technical unit. That means that the technical unit, or the second processor—provided as coprocessor—of this technical unit 116, may execute only these provided second functions, but not the other first functions. This division is made for safety-critical reasons, for instance, and/or real-time-critical considerations and/or possibly for reasons of certain hardware dependencies of individual functions with respect to the first processor to be supported or the corresponding control device, in particular. However, as mentioned earlier, this division of functions also depends on the data-exchange possibilities, namely on whether or not a real-time-critical data exchange is possible. In one preferred specific embodiment, very running-time-intensive and/or computing-time-intensive functions RF and CF with respect to the control of the operational sequences of the vehicle are specifically provided as second functions. These running-time-intensive functions RF or computing-time-intensive functions CF are then executed in the technical portable unit, via the connection means, which is 204 in this case, in that the complete functions such as F2 and F3, 202b and 203d, are transmitted or in that partial functions such as 203a1, as function F1, is transmitted as partial function of 203a. Designations 203a to 203d, 202a to 202d and 201a to 201d are used to represent the structure components according to the provided software concept, in particular the Cartronic concept. The same applies to block 205, which provides a structuring of the portable technical unit that is compatible with structure 200. Structure components 203a2, 202b1 and 203d1 then initiate functions F1, F2 and F3 transmitted from the control device, so as to execute these with the aid of coprocessor 116.

Functional blocks 201, 202 and 203 may be assigned to different priority levels, for instances, which are established as a function of criteria such as real-time capability, safety relevance or the degree of hardware dependence, for example, thereby also establishing priority levels out of which functions may or may not be executed by coprocessor 116. For instance, priority level 201 includes safety-critical software functions from which coprocessor 116 is barred. However, the priority levels may also be independent of the mentioned software structures, and the functions may be assigned across all functional blocks 201, 202 and 203 to individual priority levels as a function of certain criteria or performance quantities.

Figure 2:
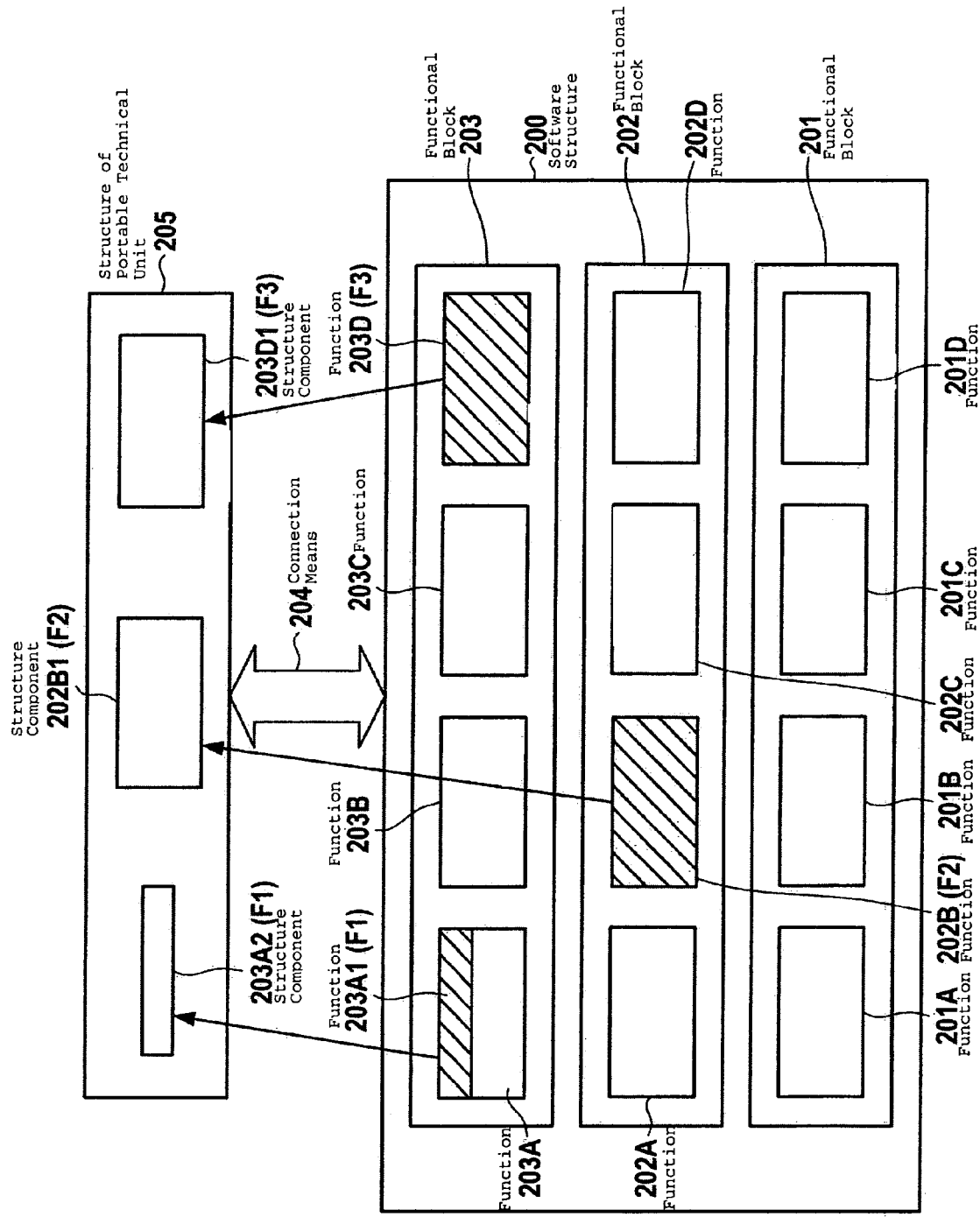
FIG. 2 shows a corresponding functionality, which is executable on the external coprocessor and transmitted, especially out of the vehicle functions interconnection, from the control device to the technical unit.
Figure 3:
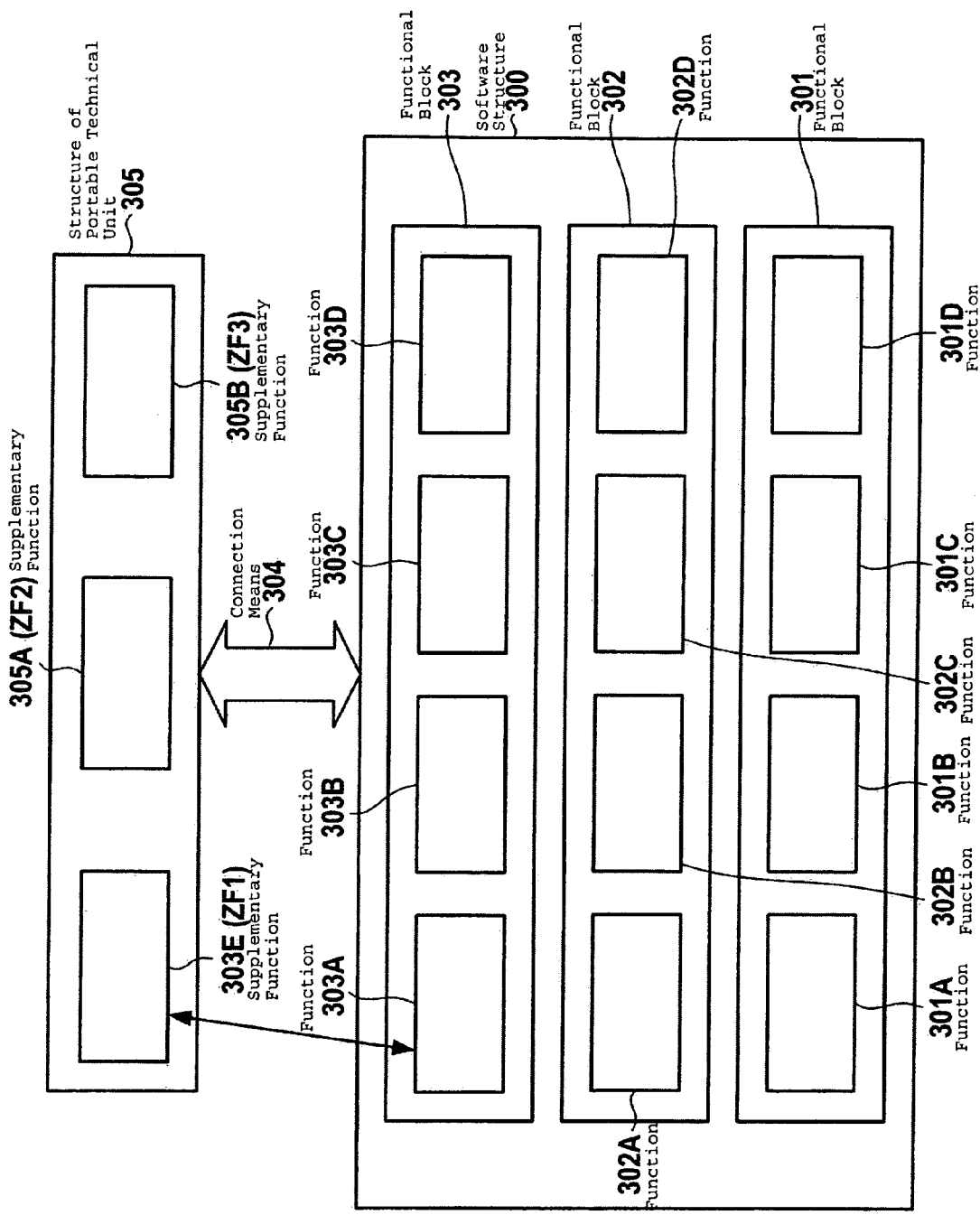
FIG. 3 shows in a further exemplary embodiment, the representation of a corresponding functionality which is executable on the external coprocessor, this functionality being provided in the portable technical device itself.

FIG. 3 shows a software structure 300 that is comparable to FIG. 2, in particular according to the mentioned Cartronic concept. Here, too, various functional blocks 301, 302 and 303 are provided, which encompass the individual structure components, in particular functions 301a to 301d, 302a to 302d and 303a to 303d. In this case as well a communication and data exchange take place via a connection means 304.

Supplementary functions, in particular user-specific functions, which are not provided in this form in structure 300 included in the control device or hardware system 100, are then made available in the associated structure 305 of the portable technical unit. Complete add-ons such as 305a and 305b are possible as structure components in this context, these representing supplementary functions ZF2 and ZF3. In addition, a supplementary function such as structure component 303e having function ZF1 may also intervene in an already existing function, such as 303a here, or interact closely therewith. The aforementioned considerations with respect to a division into first and second functions, the priority levels etc., apply to FIG. 3 in an analogous manner as well, with the difference that the functions in FIG. 3 are not loaded from the control device into the technical unit, but are already included in the technical unit as supplementary functions, which are not provided in this form in the original structure of the control device.

As shown in FIGS. 2 and 3, it may be very advantageous and useful for the utilization of the system according to the present invention if the control software and its functionality is structured according to agreed-upon software structures and interfaces such as according to the Cartronic concept, in particular standardized with respect to the utilized software and hardware components. This results in a considerable simplification with respect to the function distribution and the interaction between technical unit and control device.

Various application scenarios for the present invention are, for example:

Further developments of functionalities, in particular for convenience functions, are possible over the service life of the vehicle, which are able to increase or individualize the noticeable use value of the vehicle for the consumer or driver without additional required periphery such as sensors or actuating elements, i.e., actuating technology, or without a modified vehicle/engine construction. For instance, convenience functions for controlling the air-condition system or functions for heat management may be swapped out or may also be controlled via a supplementary functionality, in particular on a user-individual basis. A driving-speed control, in particular with respect to the dynamics, for a sportier or more conservative driving style, for example, could be controlled in this manner as well without additional loading of the vehicle-internal processing unit.

The utilization of services made available via communication networks and loaded via mobile communication networks, for instance, and implementable in the processor network, i.e., the vehicle computer and portable add-on device.

One very advantageous design scenario according to the present invention is minimizing the functionality in the control device of the vehicle so as to achieve minimum cost. In doing so, it is ensured that all basic functions in connection with the lawful and safe operation, such as exhaust gas, component diagnosis, monitoring functions etc., are located in the control device, thereby ensuring proper operation even if no supplementary computer is connected.

One form of the aforementioned scenario is the shifting of functions out of the control device into the portable computing unit, which currently utilizes the engine control device, for instance, as processing unit, without being directly related to the actual proper engine operation. As described above, these are convenience functions for controlling the air-condition system, regulating the speed, optimized functions for heat management such as heating the passenger compartment or de-icing the windows.

An additional design scenario are new features, services that are made possible via the additional portable processing unit, so that they are of interest only to a limited user circle and as a result are generally not implemented in vehicle computers or the corresponding hardware system. In particular, such specifics may be services for car rental companies, fleets of large companies, car-sharing groups or technically interested and/or skilled individuals.

Accordingly, the functionality in the portable computing unit according to the present invention, that is to say, the portable technical unit, is the expansion of onboard computer functions, for instance, such as calculating the fuel consumption, displaying the averaged fuel consumption, a linking of consumption data with driver data in the form of individual consumption data, recording of driving data, speed profiles, comparing different driving routes etc., and also the display and recording of instantaneous operating states such as cold-start consumption, charge pressure, operating type in direct injection, etc.

On this basis, the present invention allows the processor of a portable technical unit to be used for the control of operational sequences in a vehicle and thus provides increased computing capacity at minimal additional expenditure.

What is claimed is:

1. A method for controlling operational sequences in a vehicle, at least one first processor being included in at least one control device of the vehicle, the method comprising:
controlling functions of the operational sequences of the vehicle using the first processor;
connecting at least one second processor of a vehicle-external portable technical unit as a coprocessor to the at least one control device via a connector;
controlling at least one of the functions of the operational sequences using the at least one second processor; and
dividing the functions into first functions and second functions, wherein only the second functions are performed by the second processor.

2. The method as recited in claim 1, further comprising:
transmitting the functions performed by the second processor from the control device to the technical unit.

3. The method as recited in claim 1, further comprising:
storing the functions performed by the second processor in a memory of the technical unit.

4. The method as recited in claim 1, wherein the first functions include hardware-dependent functions with respect to the control device or the first processor.

5. The method as recited in claim 1, wherein the first functions include real-time-critical functions with respect to the control of the operational sequences of the vehicle.

6. The method as recited in claim 1, wherein the first functions include safety-critical functions with respect to the control of the operational sequences of the vehicle.

7. The method as recited in claim 1, wherein the second functions include at least one of running-time-intensive functions and computing-time-intensive functions, with respect to the control of the operational sequences of the vehicle.

8. The method as recited in claims 1, wherein the second functions include supplementary functions with respect to the control of the operational sequences of the vehicle, which are included only in the technical unit.

9. A method for controlling operational sequences in a vehicle, at least one first processor being included in at least one control device of the vehicle, the method comprising:
controlling functions of the operational sequences of the vehicle using the first processor;
connecting at least one second processor of a vehicle-external portable technical unit as a coprocessor to the at least one control device via a connector;
controlling at least one of the functions of the operational sequences using the at least one second processor; and dividing the functions into various priority groups, the second processor being used only for functions of at least one predefined priority group.

10. The method as recited in claim 1, further comprising: structuring the functions in accordance with a predefined software structure concept.

11. The method as recited in claim 10, wherein the functions are structured in accordance with a Cartronic concept.

12. A device for controlling operational sequences in a vehicle, comprising:
at least one control device including at least one first processor, the at least one first processor configured to control functions of the operational sequences of the vehicle;
a connector; and
at least one second processor of a vehicle-external portable technical unit, the connector configured to connect the at least one second processor to the at least one control device as a coprocessor, the second processor being configured to be used in addition to the at least one first processor for the control of the operational sequences;
wherein the functions are divided into first functions and second functions, and wherein the second processor is configured to control only the second functions.

13. The device as recited in claim 12, wherein the connector is configured as a line-conducting arrangement.

14. The device as recited in claim 12, wherein the connector is configured as a wireless arrangement.

15. The device as recited in claim 12, wherein the connector includes a first interface unit, which is connected to a communication system of the vehicle and which indirectly connects the technical unit and the control device via the communication system of the vehicle.

16. The device as recited in claim 12, wherein the connector includes a second interface unit, which is one of connected to or included in the control device, to directly connect the technical unit and the control device.

17. The device as recited in claim 12, wherein the connector includes an adapter by which a communication takes place between technical unit and control device.

18. A vehicle-external portable technical unit, comprising:
a second processor; and
an interface unit configured to connect the technical unit to a first processor of a control device in a vehicle for the control of operational sequences in this vehicle, so that the second processor, as coprocessor, is used in addition to the first processor for the control of the operational sequences;
wherein the operational sequences are divided into first operational sequences and second operational sequences, and wherein the second processor is used only for the control of the second operational sequences.

19. The vehicle-external portable technical unit as recited in claim 18, further comprising:
an adapter by which a communication takes place between the technical unit and the control device.

20. A control device for controlling operational sequences in a vehicle, comprising:
at least one first processor configured to control functions of the operational sequences of the vehicle; and
an interface unit to connect the control device to at least one second processor of a vehicle-external portable technical unit, so that the second processor as coprocessor is used in addition to the at least one first processor for the control of the operational sequences;
wherein the operational sequences are divided into first operational sequences and second operational sequences, and wherein the second processor is used only for the control of the second operational sequences.

21. The control device as recited in claim 20, further comprising: an adapter by which a communication takes place between technical unit and control device.

* * * * *